(12) United States Patent
Hjartberg et al.

(10) Patent No.: US 7,707,100 B2
(45) Date of Patent: Apr. 27, 2010

(54) SYSTEM AND METHOD FOR DISPLAYING TREND INDICATIONS

(75) Inventors: Jon S. Hjartberg, San Francisco, CA (US); Charles Thompson, Alameda, CA (US)

(73) Assignee: Interactive Data Corporation, Bedford, MA (US)

( * ) Notice: Subject to any disclaimer, the term of this patent is extended or adjusted under 35 U.S.C. 154(b) by 442 days.

(21) Appl. No.: 11/480,078

(22) Filed: Jun. 30, 2006

(65) Prior Publication Data

US 2008/0016009 A1    Jan. 17, 2008

(51) Int. Cl.
*G06Q 40/00* (2006.01)
(52) U.S. Cl. ........................................................ 705/37
(58) Field of Classification Search .................... 705/37
See application file for complete search history.

(56) References Cited

U.S. PATENT DOCUMENTS

| | | | | |
|---|---|---|---|---|
| 5,359,695 | A * | 10/1994 | Ohora et al. | 704/235 |
| 6,012,042 | A * | 1/2000 | Black et al. | 705/36 R |
| 6,629,090 | B2 * | 9/2003 | Tsuda et al. | 706/47 |
| 6,839,659 | B2 * | 1/2005 | Tarassenko et al. | 702/187 |
| 6,882,985 | B1 * | 4/2005 | Kay et al. | 705/37 |
| 6,897,867 | B2 * | 5/2005 | Katayama | 345/440 |
| 2003/0034995 | A1 * | 2/2003 | Osborn et al. | 345/713 |
| 2003/0065608 | A1 * | 4/2003 | Cutler | 705/37 |
| 2004/0128225 | A1 * | 7/2004 | Thompson et al. | 705/37 |
| 2004/0133500 | A1 * | 7/2004 | Thompson et al. | 705/37 |
| 2004/0225592 | A1 * | 11/2004 | Churquina | 705/37 |
| 2005/0091369 | A1 * | 4/2005 | Jones | 709/224 |
| 2006/0116943 | A1 * | 6/2006 | Willain | 705/35 |
| 2006/0265320 | A1 * | 11/2006 | Duquette | 705/37 |
| 2007/0067233 | A1 * | 3/2007 | Dalal | 705/37 |

OTHER PUBLICATIONS

Wong et al: How rewarding is technical analysis? Evidence from Singapore stock market, 2002, Working Paper, Department of Economics, National University of Singapore, pp. 1-21.*

Antoniou et al: Robust method for stock market data analysis, Oct. 2003, Physicia A 336 (2004) pp. 538-548. www.elsevier.com/locate/physa.*

* cited by examiner

*Primary Examiner*—Hani Kazimi
*Assistant Examiner*—Bijendra K Shrestha
(74) *Attorney, Agent, or Firm*—Brinks Hofer Gilson & Lione

(57) ABSTRACT

A system and method for displaying a trend indication using a primary and secondary indicia. The primary indicium corresponds to an overall trend indication and the secondary indicia relate to the reliability of the overall trend indication. The secondary indicia correspond to a trend indication for each phase of the selected analysis strategy. The secondary indicia provide the user with a quick and easy methodology to ascertain the reliability of the overall trend indication based on the concurrence or disagreement of the secondary indicia with the primary indicium.

20 Claims, 3 Drawing Sheets

SYSTEM AND METHOD FOR DISPLAYING TREND INDICATIONS

TECHNICAL FIELD

The present invention relates to a system and method for displaying trend indications based on the analysis of security price fluctuations over a period of time.

BACKGROUND OF THE INVENTION

Technical analysis began more than 100 years ago with the use of charts. For example, candlestick charts were originally developed in Japan over 150 years ago to anticipate movements in the rice market. For years, technicians have tried to identify patterns in individual stock prices, the market as a whole, or even in a particular industry segment. Technical analysis involves identifying and interpreting stock price movements to predict future movements in the price of a stock. However, charts only reveal data of past price movements. Therefore, in technical analysis, past price movements are often combined with knowledge about historical cycles in the market when predicting future stock prices.

Initially, technical analysis involved a very manually intensive process of identifying trends within charts. Therefore, technical analysis was not beneficial to most investors. This is due to the time delay that it would take to develop the technical analysis manually, and disseminate the information to traders. In addition, the information would be provided to many traders at rather granular intervals, making the information less valuable. With advances in computer hardware and software for identifying patterns in sets of data, technical analysis can now be performed on computers in a real time fashion.

The speed at which the data is processed also allows the user to evaluate the data based on more complex analysis strategies including multiple independent or interdependent algorithms. Accordingly, uptrend, downtrend, or neutral indications can be obtained by applying multiple algorithms within a single analysis strategy. One such analysis strategy can be applied using moving average convergence divergence (MACD). Thomas Aspry developed the MACD histogram in 1986. The (MACD) is one of the simplest and most reliable indicators available. The most popular formula for the standard MACD is the difference between a security's twenty-six day and twelve day exponential moving averages (EMA). A plot of this difference may be presented as a histogram. In addition, multiple criteria may be used to evaluate the histogram to formulate an uptrend, downtrend, or neutral trend indication.

A variety of software applications are available for displaying uptrend and downtrend indications. For example, it is well known to display security price data over a period of time in the form of a chart. Moving averages and other indicators are then drawn over the top of or adjacent to the price data and are aligned temporally. To provide a quick overview to investors, software was developed that includes visual indicators such as colored up and down arrows indicating whether the price of the security has moved up or down relative to the previous day's closing price. For example, it is well known to use a green indicator such as an arrow or some other symbol to indicate that the price of a security has moved up relative to the prior closing price, and to use a red arrow or some other symbol to indicate that the security price has moved down relative to its previous close. It is well known to display a security stock symbol in a cell or block with a color to indicate whether the stock price is up or down for the day. It is also well known to indicate the current stock price as well as a percentage change in that price for a given day in combination with a range of colors or shades indicating by percentage how much the stock price have gone up or down. Other software programs have combined the cell or block displays with the use of various color schemes or shades of color to rank a particular security. For example, one trading tool offered by J.S. Services and marketed under the name Market Color uses a variety of colors and shades to indicate whether the underlying security should be bought, held or sold. The Market Color tool displays a particular security and the current price of the security including any changes in the price of the security since the previous close.

Although products have previously been introduced that display uptrend or downtrend indicators, the user cannot easily ascertain the reliability of the indicator or understand what criteria were used in determining the trend indication. In view of the above, it is apparent that there exists a need for an improved system and method for displaying a trend indication.

BRIEF SUMMARY OF THE INVENTION

In satisfying the above need, as well as overcoming the drawbacks and other limitations of the related art, the present invention provides an improved system and method for displaying a trend indication. The system displays an indicator including a primary indicium and secondary indicia. The primary indicium corresponds to an overall trend indication and the secondary indicia relate to the reliability of the overall trend indication. The secondary indicia correspond to a trend indication for each phase or factor of a selected analysis strategy. Accordingly, the secondary indicia provide the user with a quick and easy methodology to ascertain the reliability of the overall trend indication based on the concurrence or disagreement of the secondary indicia with the primary indicium. In one example, the indicator may have a semicircular configuration where the secondary indicia form a band around the circumference of the primary indicium. The band may be broken up into multiple segments giving the appearance of a gauge on a dashboard of a vehicle. The multiple segments within the band may be representative of a trend indication for each phase of the analysis strategy. Accordingly, the primary indicium may turn green to indicate an uptrend, yellow to indicate neutral, and red to indicate a downtrend. Each secondary indicium or segment may turn the same color as the primary indicium when in agreement with the overall trend indication. However, the secondary indicium may be shown in a different color, for example white, or without a background color when in neutral or disagreement with the overall trend indication.

Many such indicators may be provided on a page or display screen and categorized according to a particular issue (stock, commodity, option, or the like) and may be categorized relative to a given time criteria. The indicator may also include text that identifies the indicator as corresponding to a particular issue, or a particular time period, for example, an hour, a day, a week, or a month. In addition, the user may click on the indicator including the primary indicium or secondary indicia to access additional information, charts, analysis, or parameters related to either the security data, the analysis strategy results, or the analysis strategy configuration. Accordingly, the user is able to quickly react to market conditions to buy or sell any issue in the portfolio based on the market trend.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
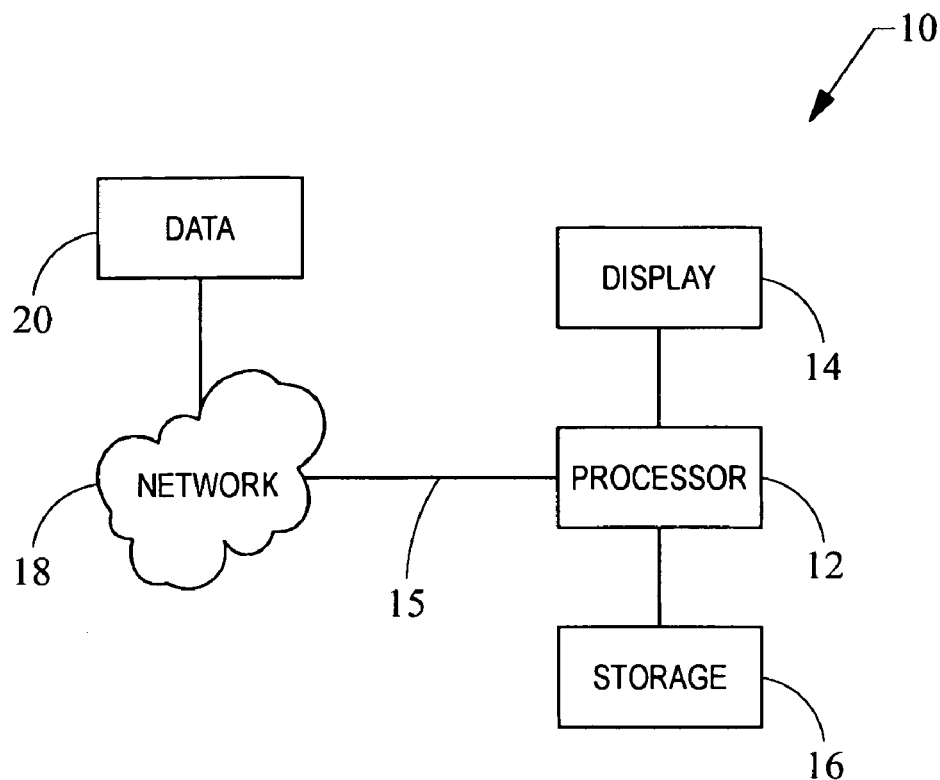
FIG. 1 is a schematic view of a system for displaying trend indications.

Referring now to FIG. 1, a system embodying the principles of the present invention is illustrated therein and designated at 10. The system 10 includes a processor 12, a display 14, and a network connection 15.

The processor 12 may be embodied in a personal computer, however, personal digital assistants, mobile phones, and other like processing units may be readily substituted and are contemplated herein. As such, a processor 12 may operate based on any commonly known operating system, such as Windows, LINUX, MacOS, or any similar operating system including any embedded variant. The processor 12 is in electrical communication with a display 14. The display 14 may be packaged with the processor 12, for example in a personal digital assistant. Alternatively, the display 14 may be remote from the processor 12 or even in wireless communication with the processor 12.

The processor 12 is also in communication with a network connection 15 and is configured to receive securities data 20 through the network connection 15. As such, the processor 12 may be in communication with a network 18, such as the Internet, to receive securities data 20 from a host server. For example, the processor 12 may communicate with the host server to receive the security data 20 in a ticker plant mode or through commercially available Active X components in real time from the host server. One example of Active X components utilize TalTrade query language (TQL) which can be used to access the securities data 20 over the internet.

In addition, the processor 12 may be in electrical communication with a storage device 16 to aid in the analysis of the securities data 20 or the configuration of the display. The storage device 16 may include random access memory, static memory, bulk storage such as hard disk drives or CD ROMs, or any similar devices. Accordingly, the software and configuration files may be contained within the storage device 16 to coordinate the functioning of the processor 12. The processor 12 functions to retrieve securities data 20 through the network connection 15, analyze the securities data 20 to generate a trend indication, and render indicia on the display 14 that correspond to the trend indication.

Figure 2:
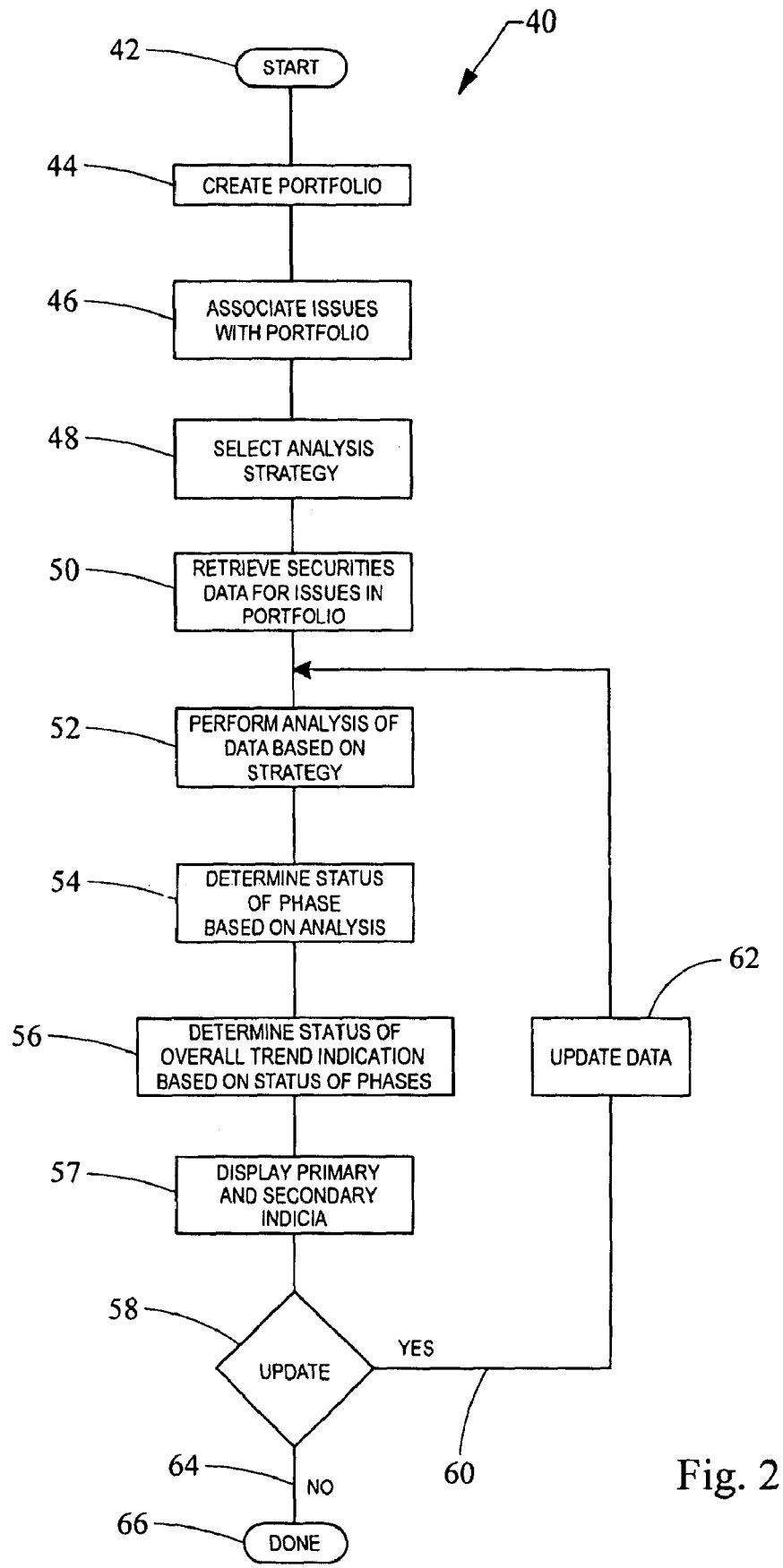
FIG. 2 is a flowchart of a method for displaying trend indications.

Now referring to FIG. 2, a method 40 is provided for analyzing and displaying trend indications. The method 40 begins in block 42. The user creates a portfolio of securities (commonly called issues) in block 44. The portfolio is a list of associated securities that is defined by the user. Accordingly, the user associates issues with the portfolio, as denoted by block 46. In block 48, the user selects an analysis strategy to be implemented by the processor 12. The analysis strategy may be selected from many various analysis strategies, including but not limited to Elliott Waves, price range, price change, stochastics, moving average, volume, MACD, Average Directional Indicator (ADX), Directional Indicator (DX-DMI), Expert Trend Locator (XTL), Profit Taking Index (PTI), Oscillator Pullback, Oscillator Breakout, Auto Channels, Directional Movement Index (DMI), Joseph Trend Index (JTI), Commodity Channel Index (CCI), and other strategies.

In block 50, the processor 12 is configured to retrieve securities data 20, for example through the network connection 15. The processor 12 may also buffer the securities data 20 in the storage device 16 to improve processing bandwidth. The processor 12 performs analysis of the securities data 20, as denoted in block 52. The analysis of the securities data 20, according to the selected analysis strategy, may include a series of analysis steps. For example, using a MACD analysis strategy an uptrend signal may be generated by three events: a positive divergence, a bullish moving average crossover, and a bullish centerline crossover. A positive divergence occurs when the MACD begins to advance and the security is still in a downward price trend. A bullish moving average crossover occurs when the MACD moves above its nine day EMA or trigger line. A bullish centerline crossover occurs when the MACD moves above the zero line and into positive territory. Although each event may be independently used to generate an uptrend or downtrend indication, each event may be used in conjunction as a different phase of the analysis strategy. For example, moving average crossovers are sometimes used to confirm a positive divergence. After a positive divergence and the bullish moving average crossover, the centerline crossover can act as an additional confirmation signal. Using a combination of each phase can generate a more robust signal.

The MACD may generate bearish signals from three main events: negative divergence, bearish moving average crossover, and bearish centerline crossover. The negative divergence forms when the security advances or moves sideways and MACD declines. A bearish moving average crossover occurs when the MACD declines below its nine day EMA. Although these signals are commonly used to generate a trend indication, they may produce false signals in many instances. As such, it is recommended that a negative divergence or a bearish moving average crossover should be confirmed with other signals, for example a bearish centerline crossover. A bearish centerline crossover occurs when the MACD moves below zero and into negative territory. The centerline crossover can act as an independent signal or confirm a prior phase of the analysis such as a moving average crossover or a negative divergence. As with bullish MACD signals, bearish signals can be combined to create more robust signals.

As described with regard to the MACD analysis strategy, an overall trend indication may be based on multiple phases of analysis to provide improved reliability. Further, each phase may utilize a unique algorithm. Therefore, separate trend indications may be independently determined based on each of the phases of the analysis strategy to give the user an indication as to the reliability of the overall trend indication. To determine the overall trend indication, the trend indications from each phase may be combined using any one of multiple techniques. For example, the combination may be performed using a weighting and/or thresholding of the trend indications for each phase of the analysis strategy.

Alternatively, the overall trend indication may be generated by one or more phases while another phase may be one or more independent algorithms used to confirm the reliability of the overall trend indication. For example, a stochastic strategy may include a stochastic algorithm to determine the overall indicator and an independent no false bar algorithm to confirm the reliability of the stochastic algorithm. Accordingly, the stochastic algorithm provides the status of the overall trend indicator and primary indicium while the no false bar algorithm provides the status for a secondary indicium. In this example, the indicator may have one primary indicium and one single secondary indicium to confirm the reliability of the primary indicium.

Referring again to FIG. 2, the processor determines the status of the trend indication for each phase of the analysis, as denoted in block 54. Further, as denoted in block 56, the status of the overall trend indication is determined, for example, based on the status of the trend indication corresponding to each phase of the analysis strategy. The status of the trend indication may include an uptrend, downtrend, or neutral status. However, the status may include other alternatives that are easily evaluated by the user, for example a binary indicator.

In block 57, the processor 12 renders indicia on the display 14 indicative of the overall trend indication, as well as indicia corresponding to the trend indication for each phase of the analysis strategy. As such, the indicia may be color-coded corresponding to the status of the trend indication. For example, green may correspond to an uptrend status, yellow may correspond to a neutral status, and red may correspond to a downtrend status. In one embodiment, the indicium corresponding to the overall trend indication may be rendered in green, yellow, and red corresponding to uptrend, neutral, and downtrend. Further, the indicia corresponding to each phase may be colored to match the indicium corresponding to the overall trend indication when in agreement with the overall trend indication, and may be rendered in another color such as white when the trend indication is neutral or disagrees with the overall trend indication. Utilizing a display strategy in this manner, allows the user to quickly scan for certain colors and easily confirm the reliability of the trend indication based on the area or geometry of the color. In addition, by further identifying which areas are missing from the confirming indicia, the user may determine which phases of the analysis strategy did not match the overall trend indication. This concept may also be applied such that the shape of the secondary indicia change based on agreement or disagreement with the overall trend indicia.

In block 58, the system 10 determines if the data is to be updated or if, for example, additional configuration or alternate evaluation has been selected by the user. If the data is to be updated, the method proceeds along line 60 to block 62. In block 62, the system 10 updates the securities data 20 and performs additional analysis on the updated data, as noted by block 52. If the data is not to be updated, the method proceeds along line 64 to block 66 where the method ends.

Figure 3:
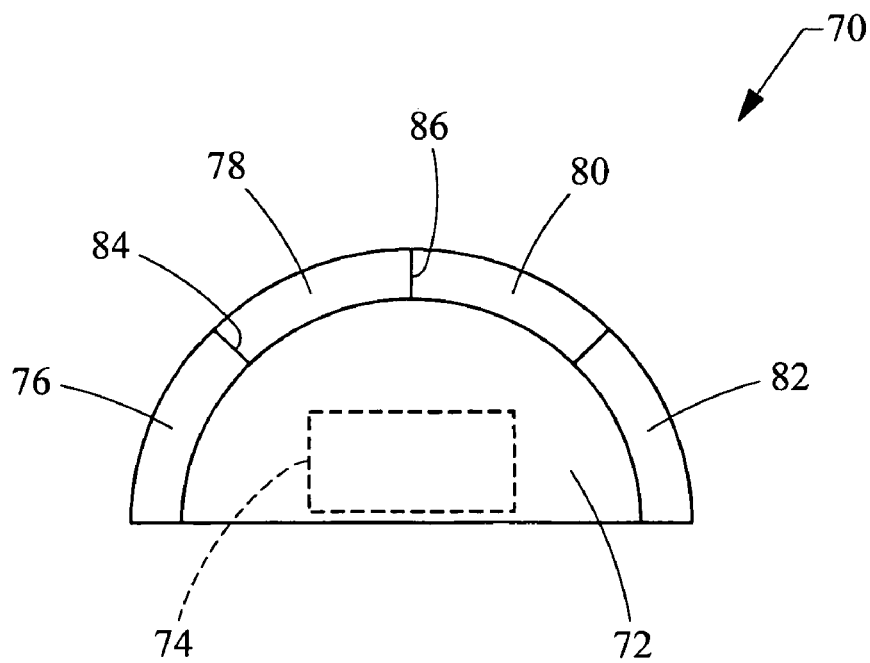
FIG. 3 is an illustration of a display including a primary signal indicium and secondary signal indicia.

Now referring to FIG. 3, an illustration of a display including indicia corresponding to a trend indication is provided. Accordingly, an indicator 70 is shown as a semicircle. The semicircular shape of the indicator 70 provides the user a familiar feel similar to that of a gauge in a dashboard in a vehicle. The indicator 70 includes a primary signal indicium 72 indicative of the overall trend indication from the analysis. As described above, the primary signal indicium 72 may be rendered in a color such as green, yellow, or red to correspond to a trend indication status such as uptrend, neutral, or downtrend. The primary signal indicium 72 may include a contiguous area of the display and may take the form of a semicircle. In addition, text 74 may be provided on the primary signal indicium 72. The text 74 may, for example, correspond to a time period, an issue, or a strength related to the trend indication or the analysis strategy.

Secondary signal indicia 76, 78, 80, 82 are also provided and correspond to the trend indication for each phase of the analysis strategy. The secondary signal indicia 76, 78, 80, 82 may be located about the periphery of the primary signal indicium 72. As such, the primary and secondary indicia of the indicator 70 may form a recognizable geometry. The geometry shown is a semicircle, however, the indicator may take the form of other geometries including, but not limited to squares, triangles, and circles. Further, the geometry may form a single contiguous region, although a series of discontinuous regions may also be used.

Allowing the user to easily scan the status of each indicium, the secondary signal indicia 76, 78, 80, 82 may be located in a series configuration. For example, a first secondary signal indicium 76 may be located adjacent to the second secondary signal indicium 78. Further, the first secondary signal indicium 76 may abut the second secondary signal indicium 78, and may share a first edge 84. Similarly, a third secondary signal indicium 80 may abut the second secondary signal indicium 78 and may share a second edge 86 opposite the first edge 84, and so on, thereby providing a contiguous series of secondary signal indicia 76, 78, 80, 82 that may be easily evaluated by the user in ascertaining the reliability of the overall trend indication.

Figure 4:
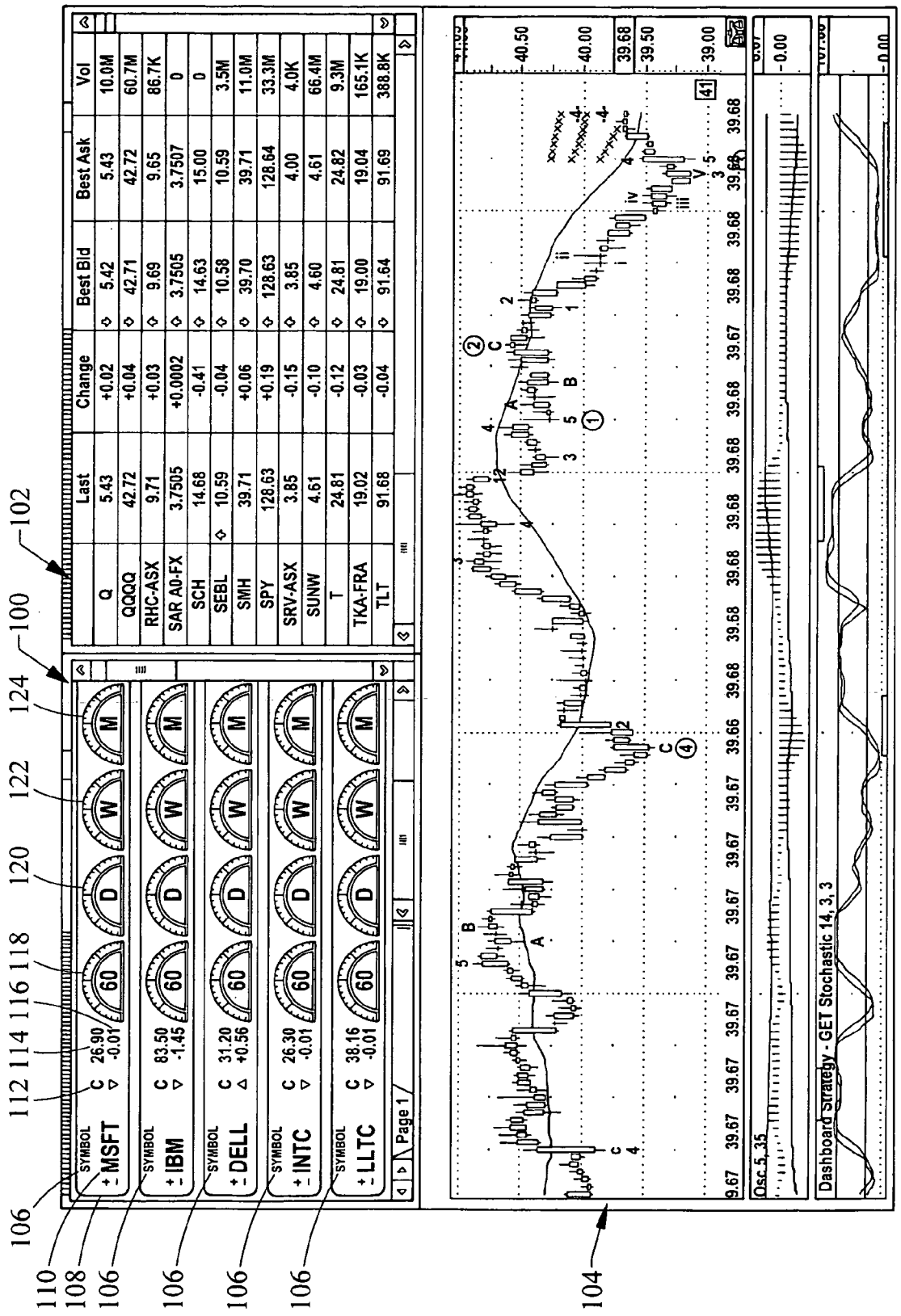
FIG. 4 is an illustration of a display including a plurality of primary and secondary signal indicia for a portfolio of securities.

The indicator 70 may be readily extended to provide a display for an entire portfolio as illustrated by the graphical user interface in FIG. 4. Accordingly, a region 100 is provided for displaying a plurality of indicators for each issue in a portfolio. Further, other graphs, information, or charts may be provided on the display corresponding to the portfolio. For example, chart 102 may provide last trade, price change, bid, and ask information for the issues in the portfolio. Further, graph 104 provides price information over a period of time, for example in candlestick form, optionally including other technical analysis such as moving average, oscillation, stochastic, or similar information.

The region 100 may include sub-regions 106 that group information related to a specific issue. One such sub-region is denoted by reference numeral 108. Sub-region 108 includes an issue symbol 110. The issue symbol may be the letters used to identify the security on an exchange, such as DOW, NASDAQ, or CBOE. In addition, the sub-region 108 may include an indicator 112 that denotes whether the stock has gone up or down relative to the previous day's closing price. Similarly, the sub-region 108 may include the present stock price 114 and the change in the stock price from the previous day's close, as denoted by reference numeral 116. Further, a plurality of indicators 118, 120, 122, and 124 may be provided corresponding to multiple trend indications for a particular issue. The indicators 118, 120, 122, and 124 may take the form of indicator 70 (from FIG. 3) including any of the variations described above. In addition, indicators 118, 120, 122, and 124 may correspond to the same analysis strategy, or provide trend indications based on the analysis strategy according to a different time period of securities data. For example, indicator 118 may include the primary and secondary indicia for an analysis strategy according to the last hour of securities data. Meanwhile, indicator 120 may include primary and secondary indicia for the same analysis strategy according to the securities data for the previous day. Similarly, indicator 122 may include primary and secondary indicia corresponding to trend indications for the same analysis strategy according to the last week of securities data, while indicator 124 may correspond to trend indications for the analysis strategy according to the last month of security data.

In addition, the indicators may be integrated into the graphical user interface such that the primary indicium or secondary indicia may be selected, for example by a mouse click, to provide access to additional information, charts or analysis related to either the security data, the analysis strategy results, or the analysis strategy configuration. For example, clicking the indicator may display a graphical representation of the analysis. Further, when the user selects a new analysis strategy, the system may be configured to automatically update the analysis strategy for each indicator related to an issue, or additionally for each issue in the portfolio. As such the user can quickly and easily evaluate the entire portfolio using a new analysis strategy with a single click.

Utilizing a primary and secondary indicia in the manner described above, a display may be provided allowing the user to quickly and easily ascertain trend indications as well as confirming the reliability of such trend indications in an easy to understand manner.

As a person skilled in the art will readily appreciate, the above description is meant as an illustration of the principles this invention. This description is not intended to limit the scope or application of this invention in that the invention is susceptible to modification, variation and change, without departing from the spirit of this invention, as defined in the following claims.

The invention claimed is:

1. A system for producing a trend indication to trade a security, the system comprising:
   a processor configured to analyze security market data according to an analysis strategy;
   a network connection in communication with the processor and the processor receiving market security data through the network connection from an external source, the processor generating an overall trend indication to trade a security based on analysis of the security market data, wherein the analysis strategy has a plurality of phases;
   a display in electrical communication with the processor, the processor being configured to render a primary signal indicium and at least one secondary signal indicium on the display, the primary signal indicium being displayed in a first portion of a display area wherein the primary signal indicium is indicative of the overall trend indication to trade the security based on at least one phase of the plurality of phases, the at least one secondary signal indicium being displayed in a second portion of the display area, each secondary signal indicium being based on a phase of the plurality of phases of the analysis strategy, wherein the at least one secondary signal indicium is indicative of the reliability of the overall trend indication; and
   wherein selecting a second analysis strategy will automatically generate the overall trend indications based on the second analysis strategy for each security of the portfolio of securities and update the plurality of primary signal indicia and the plurality of secondary signal indicia for each security of the portfolio of securities.

2. The system according to claim 1, wherein
the overall trend indication includes one of an uptrend, downtrend, and neutral status.

3. The system according to claim 1, wherein
the at least one trend indication of the plurality of phases includes one of an uptrend, downtrend, and neutral status.

4. The system according to claim 1, wherein
selecting the primary or the at least one secondary signal indicium displays a graphical representation of the analysis to a user.

5. The system according to claim 1, wherein
selecting the primary or the at least one secondary signal indicium displays an interface configured to edit analysis parameters.

6. The system according to claim 1, wherein
the primary signal indicium and the at least one secondary signal indicium form a contiguous display region.

7. The system according to claim 1, wherein
signal indicia of the at least one secondary signal indicium are arranged in a series configuration.

8. The system according to claim 1, wherein
the at least one secondary signal indicium comprises a first, second, and third secondary indicium arranged in a series configuration, the second secondary indicium having a first and second opposite edge, the first secondary indicium being located adjacent the first edge of the second secondary indicium, and the third secondary indicium being located adjacent the second edge of the second secondary indicium.

9. The system according to claim 1, wherein
the at least one secondary signal indicium is arranged about the periphery of the primary signal indicium.

10. The system according to claim 1, wherein
a signal indicium of at least one secondary signal indicium is rendered in a first, second, or third color corresponding to the overall trend indication of the primary signal indicium when the signal indicium is in agreement with the primary signal indicium, and the signal indicium is rendered in a fourth color when the signal indicium is not in agreement with the primary signal indicium.

11. A method for displaying a trend indication to trade a security, the method comprising:
   acquiring security market data;
   analyzing the security market data according to an analysis strategy by a processor;
   generating an overall trend indication to trade a security based on analysis of the security market data, wherein the analysis strategy has a plurality of phases each of which is indicative of a trend indication;
   displaying a primary signal indicium on a display in a first portion of a display area wherein the primary signal indicium is indicative of the overall trend indication to trade the security based on at least one phase of the plurality of phases;
   displaying at least one secondary signal indicium on the display in a second portion of the display area, each secondary signal indicium being based on a phase of the plurality of phases of the analysis strategy, wherein each secondary signal indicium is indicative of the reliability of the overall trend indication; and
   wherein selecting a second analysis strategy will automatically generate the overall trend indications based on the second analysis strategy for each security of the portfolio of securities and update the plurality of primary signal indicia and the plurality of secondary signal indicia for each security of the portfolio of securities; and
   displaying a graphical representation of the analysis in response to selecting the primary or the at least one secondary signal indicium.

12. A method for displaying a trend indication to trade a security, the method comprising:
   acquiring security market data;
   analyzing the security market data according to an analysis strategy by a processor;
   generating an overall trend indication to trade a security based on analysis of the security market data, wherein the analysis strategy has a plurality of phases each of which is indicative of a trend indication;

displaying a primary signal indicium on a display in a first portion of a display area wherein the primary signal indicium is indicative of the overall trend indication to trade the security based on at least one phase of the plurality of phases;

displaying at least one secondary signal indicium on the display in a second portion of the display area, each secondary signal indicium being based on a phase of the plurality of phases of the analysis strategy, wherein each secondary signal indicium is indicative of the reliability of the overall trend indication; and wherein selecting a second analysis strategy will automatically generate the overall trend indications based on the second analysis strategy for each security of the portfolio of securities and update the plurality of primary signal indicia and the plurality of secondary signal indicia for each security of the portfolio of securities; and displaying an interface configured to edit analysis parameters in response to selecting the primary or the at least one secondary signal indicium.

13. A method for displaying a plurality of trend indications to trade a portfolio of securities, the method comprising:

acquiring security market data for a plurality of securities;

selecting an analysis strategy for each security from a plurality of analysis strategies;

analyzing the security market data for each security according to the selected analysis strategy by a processor;

generating a plurality of overall trend indications to trade a security based on analysis of the security market data for the security, wherein the analysis strategy has a plurality of phases each of which is indicative of a trend indication;

displaying each primary signal indicium from a plurality of primary signal indicia on a display in a first portion of a display area wherein the primary signal indicia are indicative of the overall trend indication to trade the security based on at least one phase of the plurality of phases;

displaying each at least one secondary signal indicium of a plurality of at least one secondary signal indicia on the display in a second portion of the display area, each secondary signal indicium being based on a phase of the plurality of phases of the analysis strategy, wherein each secondary signal indicium is indicative of at least one trend indication of the plurality of phases; and wherein selecting a second analysis strategy will automatically generate the overall trend indications based on the second analysis strategy for each security of the portfolio of securities and update the plurality of primary signal indicia and the plurality of secondary signal indicia for each security of the portfolio of securities.

14. The method according to claim 13, wherein the overall trend indication includes one of an uptrend, downtrend, and neutral status.

15. The method according to claim 13, wherein the trend indication of each of the plurality of phases includes one of an uptrend, downtrend, and neutral status.

16. The method according to claim 13, wherein the primary signal indicium and the at least one secondary signal indicium are displayed in a contiguous region.

17. The method according to claim 13, wherein signal indicia of the at least one secondary signal indicium are arranged in a series configuration.

18. The method according to claim 13, wherein the at least one secondary signal indicium are arranged such that a first, second, and third secondary indicium are arranged in a series configuration, the second secondary indicium having a first and second opposite edge, the first secondary indicium is located adjacent the first edge of the second secondary indicium, and the third secondary indicium is located adjacent the second edge of the second secondary indicium.

19. The method according to claim 13, wherein the at least one secondary signal indicium is arranged about the periphery of the primary signal indicium.

20. A method for displaying a trend indication to trade a security, the method comprising:

acquiring security market data;

analyzing the security market data according to an analysis strategy by a processor;

generating an overall trend indication to trade a security based on analysis of the security market data, wherein the analysis strategy has a plurality of phases each of which is indicative of a trend indication;

displaying a primary signal indicium on a display in a first portion of a display area wherein the primary signal indicium is indicative of the overall trend indication to trade the security based on at least one phase of the plurality of phases;

displaying at least one secondary signal indicium on the display in a second portion of the display area, each secondary signal indicium being based on a phase of the plurality of phases of the analysis strategy, wherein each secondary signal indicium is indicative of the reliability of the overall trend indication; and wherein selecting a second analysis strategy will automatically generate the overall trend indications based on the second analysis strategy for each security of the portfolio of securities and update the plurality of primary signal indicia and the plurality of secondary signal indicia for each security of the portfolio of securities; and wherein a signal indicium of at least one secondary signal indicium is rendered in a first, second, or third color corresponding to the overall trend indication of the primary signal indicium when the signal indicium is in agreement with the primary signal indicium, and the signal indicium is rendered in a fourth color when the signal indicium is not in agreement with the primary signal indicium.

* * * * *